(12) United States Patent
Ashton et al.

(10) Patent No.: US 6,959,369 B1
(45) Date of Patent: Oct. 25, 2005

(54) METHOD, SYSTEM, AND PROGRAM FOR DATA BACKUP

(75) Inventors: Lyn Lequam Ashton, Tucson, AZ (US); Anthony Steve Pearson, Tucson, AZ (US); Anand Rao Savur, San Jose, CA (US); John Glenn Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 10/383,451

(22) Filed: Mar. 6, 2003

(51) Int. Cl.[7] .............................................. G06F 12/16
(52) U.S. Cl. ................................................... 711/162
(58) Field of Search ................................ 711/161, 162

(56) References Cited

U.S. PATENT DOCUMENTS

| | | | |
|---|---|---|---|
| 5,410,667 A | 4/1995 | Belsen et al. | |
| 5,832,514 A | 11/1998 | Norin et al. | |
| 6,199,074 B1 | 3/2001 | Kern et al. | |
| 6,212,531 B1 | 4/2001 | Blea et al. | |
| 6,557,089 B1 | 4/2003 | Reed et al. | |
| 6,611,901 B1 | 8/2003 | Micka et al. | |
| 6,715,036 B1 * | 3/2004 | Burton et al. | 711/118 |
| 6,732,244 B2 | 5/2004 | Ashton et al. | |
| 6,772,302 B1 * | 8/2004 | Thompson | 711/162 |
| 6,829,688 B2 * | 12/2004 | Grubbs et al. | 711/162 |

* cited by examiner

*Primary Examiner*—Kevin L. Ellis
(74) *Attorney, Agent, or Firm*—Janaki K. Davda; Konrad Raynes & Victor LLP

(57) ABSTRACT

Disclosed is a system, method, and program for data backup. A backup copy of source data is created. A backup dataset inventory is created when the backup copy is created. The backup dataset inventory includes a backup dataset identifier and an originating source volume identifier for each dataset of the source data. The backup copy is copied to a storage medium. A storage media inventory is created when copying the backup copy to the storage medium. The storage media inventory includes the originating source volume identifier and a storage media identifier for each dataset of the source data. This single backup scheme eliminates having to issue both image copies for individual dataset recovery, as well as, separate full volume dumps for recover of failed physical volumes or to recover an entire application.

40 Claims, 10 Drawing Sheets

Backup Dataset Inventory 124D

| Backup Dataset | Source Volume from which Backup Dataset Originated | Version Time Stamp Token |
|---|---|---|
| X | 204S | Monday 3:05 p.m. |
| X | 204S | Tuesday 3:11 p.m. |
| Y | 204S | Monday 3:05 p.m. |
| Y | 204S | Tuesday 3:11 p.m. |
| Z | 204S, 206S | Monday 3:05 p.m. |
| Z | 204S, 206S | Tuesday 3:11 p.m. |

Storage Media Inventory 126B

| Source Volumes | Version Time Stamp Token | Storage Media |
|---|---|---|
| 204S | Monday 3:05 p.m. | 210 |
| 204S | Tuesday 3:11 p.m. | 220 |
| 206S | Monday 3:05 p.m. | 212 |
| 206S | Tuesday 3:11 p.m. | 222 |
| ... | ... | ... |

METHOD, SYSTEM, AND PROGRAM FOR DATA BACKUP

CROSS-REFERENCE TO RELATED APPLICATIONS

This application is related to commonly owned U.S. Pat. No. 6,732,244 issued on May 4, 2004, having application Ser. No. 10/055,297, entitled "Instant Visual Copy Technique with Expedited Creation of Backup Dataset Inventory from Source Dataset Inventory," by Lyn L. Ashton, et al., filed on Jan. 1, 2002, and which is incorporated by reference herein in its entirety.

BACKGROUND OF THE INVENTION

1. Field of the Invention

The present invention is directed to data backup and recovery.

2. Description of the Related Art

A number of direct access storage device (DASD) subsystems are capable of performing "instant virtual copy" operations, also referred to as "fast replicate functions." Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

Instant virtual copy has been an important development in modern disk subsystems, and a number of different techniques have surfaced. As one example, International Business Machines Corporation (IBM) has developed the "FLASH COPY" technique, as described in different publications including U.S. Pat. No. 6,611,901, issued on Aug. 26, 2003, having U.S. application Ser. No. 09/347,344, filed on Jul. 2, 1999 and entitled "Method, System, and Program for Maintaining Electronic Data as of a Point-In-Time." A different fast replicate technique is the "SNAPSHOT" technique disclosed in U.S. Pat. No. 5,410,667 entitled "Data Record Copy System for a Disk Drive Array Data Storage Subsystem," which issued on Apr. 25, 1995. The foregoing references are incorporated herein by reference in their entirety.

Instant virtual copy techniques have been developed, at least in part, to quickly create a duplicate copy of data without interrupting or slowing foreground processes. A natural extension of this function has been the creation of a physical "backup" copy of the source data, to aid in disaster recovery. Under one such technique, an operation such as "FLASH COPY" or "SNAPSHOT" operation is used to perform an instant virtual copy operation; this creates a virtual target volume identical to the source volume in all respects. Then, the virtual target volume is taken off-line (i.e., is not accessible), which may occur automatically as a result of the instant virtual copy operation or manually at the direction of a system administrator.

Normal instant virtual copy operations can involve tens of thousands of files. Some application programs, such as SAP R/3 applications, using a database system, such as DB2®, may have 30,000 or more datasets. A dataset is a named set of records stored or processed as a unit. R/3 applications are a set of integrated business applications from Systems, Application and Products (SAP) in data processing. R/3 applications use a client-server model. R/3 applications enable storage, retrieval, and analysis of data for business processes. DB2® refers to relational database management system (RDBMS) products from IBM.

To perform backups of each dataset, applications may stop processing or process in read-only mode. In read-only mode, the applications read data in datasets, but do not update the data. It takes many hours to perform the backups for 30,000 or more datasets. Thus, for these hours, the applications are unable to update datasets, which is very inefficient.

In some cases, customers backup datasets "while open" (i.e., while one or more database transactions is in process) and rely on forward recovery and backout logs to resynchronize the data after recovery. In particular, each time a record is updated as part of a transaction, the "before" version of the record is stored in the backout log, and the "after" version of the record is stored in the forward recovery (redo) log. For example, it may take five hours to backup 30,000 datasets, with 6,000 of these datasets being processed each hour. If the backup datasets are to be used for recovery, the backup datasets are recovered (e.g., copied to a source from a backup copy), and the forward recovery or backout logs are applied to the recovered backup datasets. The forward recovery and backout logs are used to undo or redo updates of the backup datasets to get the backup datasets to match up to datasets at a certain time. If a backup was taken at midnight (12:00 a.m.), it is possible to apply updates from the forward recovery log for five hours forward to get a copy that represents datasets at 5:00 a.m. If a backup was taken at 5:00 a.m., it is possible to apply five hours of updates from the backout log to get a copy that represents datasets at midnight. In some cases, it takes three hours to apply one hour of the updates in the logs. Therefore, it may take up to fifteen hours to forward or backout a recovered dataset by five hours.

In cases in which datasets that belong to applications (e.g., SAP applications) are interrelated, the applications' datasets need to be backed up at the same time in order to recover (i.e., restore) the entire application.

Database management systems write logs of changes to database records along with other metadata. Many database management systems (e.g., DB2®) allow backups to be taken even when the database records are being updated, and these are referred to as "fuzzy" state backups. The database management systems allow the fuzzy state backups because the database management systems can recover the data to bring it back to a consistent state using the forward recovery and backout logs. Although this technique does not result in application outage (i.e., the application is allowed to read or write database records), the time that it takes to retrieve the metadata and establish a "instant virtual copy" (or "virtual concurrent copy," e.g., FLASH COPY) for thousands of datasets is tens of minutes or more. Long fuzzy state backups also result in unacceptably long recovery times.

Some recovery systems perform two backups. First, the recovery systems generate image copies of individual datasets. Second, the recovery systems take one or more volume dumps for large scale recovery.

Furthermore, in cases in which the virtual copies are stored on physical magnetic tapes, it can be difficult to locate a particular dataset on a backup volume on the magnetic tape. In some cases, the magnetic tapes are manually reviewed to locate particular datasets. This process, however, is consumptive of time and processing resources.

Thus, there is a need for more efficient backup of data and data recovery.

SUMMARY OF THE INVENTION

Provided are a method, system, and program for data backup. A backup copy of source data is created. A backup dataset inventory is created when the backup copy is created. The backup dataset inventory includes a backup dataset identifier and an originating source volume identifier for each dataset of the source data. The backup copy is copied to a storage medium. A storage media inventory is created when copying the backup copy to the storage medium. The storage media inventory includes the originating source volume identifier and a storage media identifier for each dataset of the source data. In certain implementations, the storage medium is removable. In certain implementations, the storage medium is remote.

In additional implementations, the source data includes a dataset and the dataset is recovered from the storage medium using the backup dataset inventory to identify an originating source volume from which the dataset originated and using the storage media inventory to identify the storage medium on which the originating source volume resides.

In further implementations, the source data comprises datasets and all datasets associated with a failed physical volume are recovered.

In yet further implementations, the source data comprises datasets and all datasets associated with an application are recovered.

In certain implementations, the source volume comprises multiple datasets and wherein creation of the backup copy eliminates a need to generate backup image copies of each of the multiple datasets.

In further implementations, a data storage structure includes a source dataset inventory including a source volume identifier and an associated dataset identifier, a backup dataset inventory including an originating source volume identifier and an associated backup dataset identifier, and a storage media inventory including an originating source volume identifier and a storage media identifier.

In yet further implementations, each dataset that is backed up has a unique version time stamp token, the backup dataset inventory stores a version time stamp token for each dataset, and the storage media inventory stores a corresponding version time stamp token. A request is received to recover a version of a dataset. The storage medium on which the version of the dataset is stored is identified by matching the version time stamp token in the backup dataset inventory to a corresponding version time stamp token in the storage media inventory.

The described implementations of the invention provide a method, system, and program for data backup that eliminates having to issue both image copies for individual dataset recovery, as well as, separate full volume dumps for recover of failed physical volumes or to recover an entire application.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
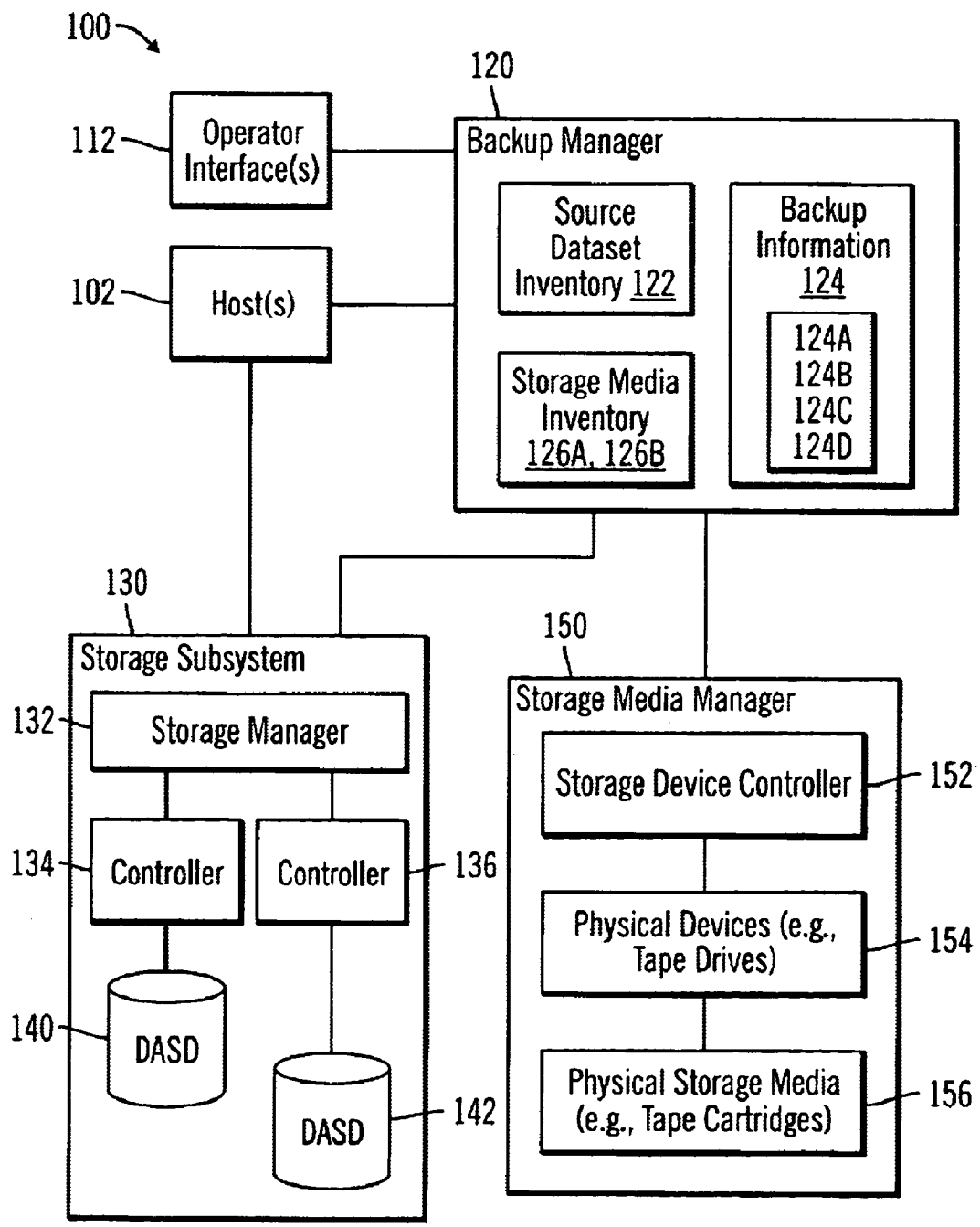
FIG. 1 illustrates, in a block diagram, a computing environment in accordance with certain implementations of the invention.

FIG. 1 illustrates, in a block diagram, a computing environment 100 in accordance with certain implementations of the invention. In the illustrated example, the computing environment 100 includes one or more hosts 102, one or more operator interfaces 112, backup manager 120, storage subsystem 130, and storage media manager 150.

The hosts 102 and operator interfaces 112 may be any computational device known in the art, such as a personal computer, a workstation, a server, a mainframe, a hand held computer, a palm top computer, a telephony device, network appliance, human operator terminals, etc., or a combination of the foregoing. The hosts 102 and operator interfaces 112 may include any operating system known in the art, such as the IBM OS/390® or z/OS® operating system. In certain implementations, the hosts 102 may comprise application programs. The operator interface 112 may include features such as a computer, input/output terminal, keyboard, video monitor, dials, switches, or other human/machine interface.

In FIG. 1, the one or more hosts 102 and operator interfaces 112 are shown connected to backup manager 120 for case of illustration. In certain implementations, the backup manager 120 may be implemented as software residing on the hosts 102 and/or operator interfaces 112. In certain implementations, the backup manager 120 may be implemented in software residing on a server or other computational device. In further implementations, the backup manager 120 may be implemented with logic circuitry. The backup manager 120 includes a source dataset inventory 122, backup information 124, and storage media inventory 126A, 126B. The source dataset inventory 122 includes a source volume identifier and an associated dataset identifier. The backup information 124 includes a volume inventory 124A, a copy pool directory 124B, a backup dataset inventory 124C, and an alternative backup dataset inventory 124D. The storage media inventory 126A includes an originating source volume identifier and a storage media identifier, and the storage media inventory 126B additionally includes a version time stamp token.

In certain implementations, the source dataset inventory 122 may be stored in memory (e.g., at the host 102 when the backup manager 120 is implemented as software at the host 102), while the backup information 124 and the storage media inventory 126A, 126B are stored in persistent storage (e.g., disk).

Among other components, the storage subsystem 130 includes a storage manager 132, along with direct access storage devices (DASDs) 140, 142 and their associated controllers 134, 136. The storage subsystem 130 may include other storage media in place of or in addition to DASD. The storage manager 132 manages read/write operations upon the DASD 140, 142 in response to stimuli from sources such as external user applications such as those running on hosts 102, a system administrator via the operator interface 112, the backup manager 120, and/or internal processes of the storage manager 132.

The storage media manager 150 includes a storage device controller 152, physical devices (e.g., tape drives) 154, and physical storage media (e.g., magnetic tapes) 156. The physical storage media 156 may be any removable and/or remote storage media.

Considering the components of FIG. 1 in greater detail, the backup manager 120 comprises a processing entity that directs the storage subsystem 130 to backup customer source data as backup data on the DASDs 140, 142. The backup manager 120 includes or has access to a source dataset inventory 122, backup information 124, and storage media inventory 126A, 126B described below. Each of the source dataset inventory 122, backup information 124, and/or storage media inventory 126A, 126B may be embodied in various storage constructs, depending upon the implementation specifics of the backup manager 120. For example, source dataset inventory 122 may be stored in memory, storage buffers, or registers. Backup information 124 and/or storage media inventory 126A, 126B may be stored on disk, magnetic tape, or another persistent storage media. Contents of the source dataset inventory 122, backup information 124, and storage media inventory 126A, 126B are described in greater detail below. The backup manager 120 is coupled to one or more operator interfaces 112 and hosts 102 and receives directions and other input from the one or more operator interfaces 112 and hosts 102.

One example of the storage subsystem 130 is a machine such as a storage manager component of an IBM brand S/390® machine. The storage subsystem 130 receives instructions and data from the hosts 102, backup manager 120, or a combination thereof. In one implementation, the operator interface 112 includes a software module to process operator commands for input to the storage manager 132. As an example, this software may comprise the IBM brand Data Facility System Managed Storage (DFSMS) software module.

The storage manager 132, which utilizes, for example, the IBM brand z/OS® operating system, directs operations of the storage subsystem 130. In certain implementations, an interface is provided to conduct communications between the storage manager 132 and the storage controllers 134, 136 that manage the DASDs 140, 142.

The DASD controllers 134, 136 manage read/write operations upon DASD storage media 140, 142 as directed by the storage manager 132. DASD storage 140, 142 may be implemented as a redundant array of inexpensive disks (RAID) storage. In this example, the DASD controller 134, 136 and storage 140, 142 may be implemented by using a commercially available product such as an IBM Enterprise Storage Server® (ESS).

The controllers 134, 136 manage the DASDs 140, 142 according to home area architecture, log structured array, or another storage strategy. For ease of explanation, the invention as illustrated herein utilizes home area architecture. Also as illustrated, the storage manager 132 manages data of the DASDs 140, 142 according to "volumes," which are referred to as "logical" or "virtual" volumes. Instead of volumes, however, the storage manager 132 may manage data according to any other useful data unit, such as physical device, logical device, logical surface or cylinder, sector, collection of pages, address range(s), etc. The controllers 134, 136 receive data access requests from the storage manager 132 in terms of logical volumes, and implement the data access requests by translating them into terms of physical storage locations on the physical disks used to implement the DASD storage 140, 142.

In certain implementations, the backup manager 120 retrieves data from DASDs 140, 142 through storage manager 132. The backup manager 120 forwards the data to storage device controller 152 to store the data on physical storage media 156.

Figure 2A:
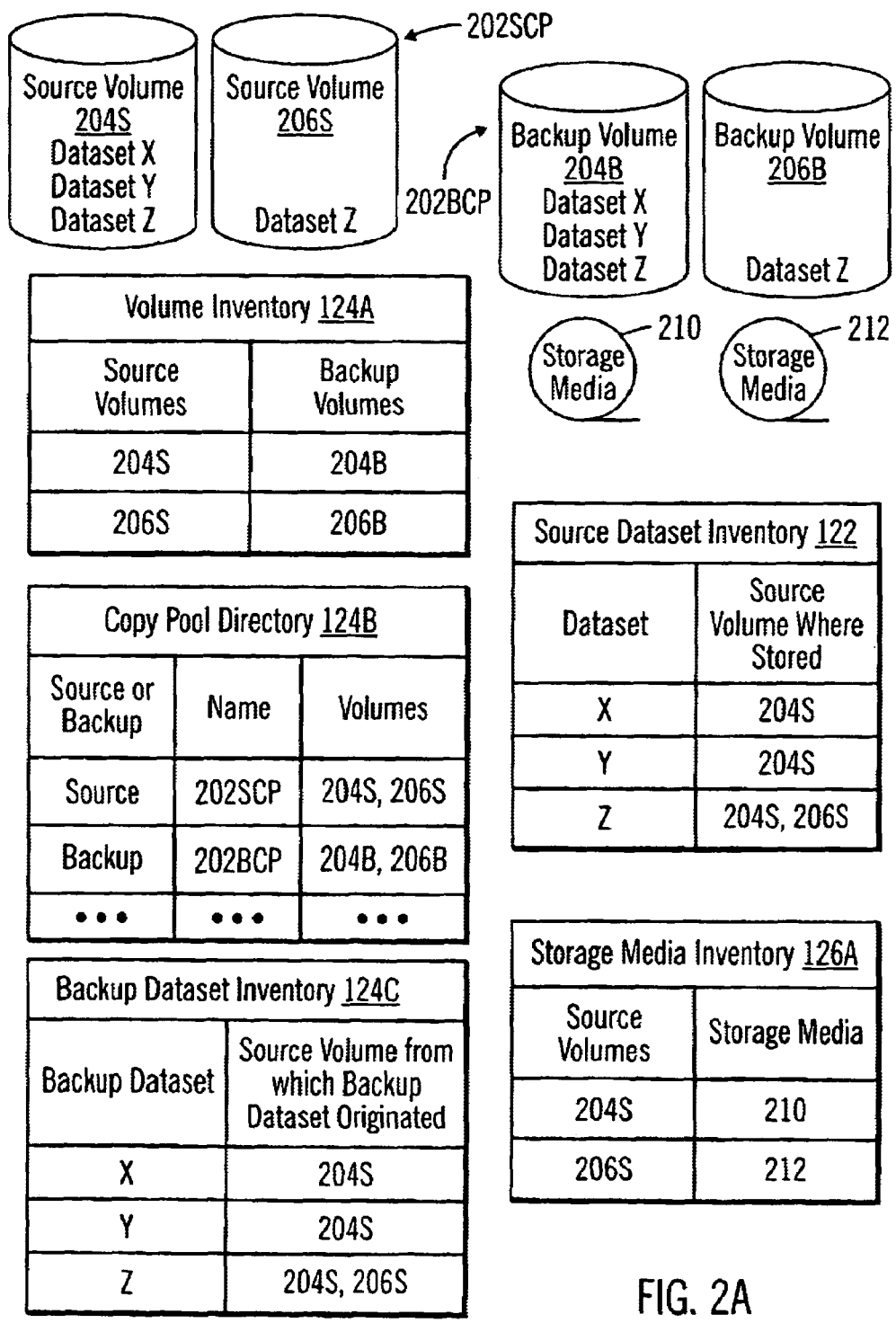
FIGS. 2A and 2B illustrate, in block diagrams, source and backup volumes and their datasets, as well as various inventories and directories in accordance with certain implementations of the invention.

FIG. 2A illustrates, in a block diagram, source and backup volumes and their datasets, as well as various inventories and directories in accordance with certain implementations of the invention. Each of the source volumes 204S, 206S as illustrated comprises a logical volume of data present in one or more of the DASDs 140, 142. Multiple volumes may reside on one DASD 140 or 142. The source volume 204S includes Dataset X, Dataset Y, and a first part of Dataset Z. Each dataset may comprise one or more files, pages, bytes, records, tables, or other units of data. The source volume 206S includes a second part of Dataset Z. Together the source volumes 204S, 206S make up a source copy pool 202SCP.

The "target" or "backup" volumes 204B, 206B correspond to the source volumes 204S, 206S. Like the source volumes, each backup volume 204B, 206B as illustrated comprises a logical volume of data that is present in one or more of the DASDs 140, 142. The backup volume 204B includes copies of Dataset X, Dataset Y, and a first part of Dataset Z. The backup volume 20613 includes a second part of Dataset Z. Together, the backup volumes 204B, 206B make up a backup copy pool 202BCP.

The underlying data of the volumes 204S, 206S, 204B, and 206B exist in the DASDs 140, 142.

FIG. 2A also illustrates various metadata constructs 122, 124A, 124B, 124C, and 126A that reside in the backup manager 120 or are accessible by the backup manager 120. The source dataset inventory 122 lists each source dataset in the volumes 204S, 206S and its source volume. For example, the source dataset inventory 122 shows that source Dataset X is located in source volume 204S. In FIG. 2A, the backup dataset inventory 124C lists each backup dataset in the storage media 210 and 212 and relates the backups of datasets to the source volumes from which the datasets originated (i.e., from which a backup copy of the dataset was taken). For example, the backup dataset inventory 124C shows that the backup Dataset X originated from source volume 204S. In particular, the backup dataset inventory 124C lists a backup dataset identifier and an originating source volume identifier.

The volume inventory 124A identifies corresponding source and backup volumes. For instance, the inventory 124A shows that source volume 204S corresponds to backup volume 204B. In other words, backup volume 204B is a replica of source volume 204S. The copy pool directory 124B contains the definition of each copy pool. For instance, the copy pool directory 124B shows that the copy pool 202SCP is comprised of volumes 204S and 206S.

The backup dataset inventory 124C and the source dataset inventory 122 are similar, but the source dataset inventory 122 is captured in memory, while the backup dataset inventory 124C is made persistent in a database or non-volatile storage for future use. The source dataset inventory 122 is discarded when no longer needed after the backup dataset inventory 124C has been created and/or updated.

The storage media inventory 126A lists each source volume and the storage media on which the source volume is stored. For example, source volume 204S is stored on storage media 210, while source volume 206S is stored on storage media 212. In certain implementations, the storage media inventory 126A does not represent a one-to-one relationship between source volumes and storage media. For example, it is possible for multiple source volumes to be on a single storage medium. It is also possible for one source volume to span multiple storage media. In either case, the storage media inventory 126A may be used to list source volumes and the one or more storage media on which the source volumes are stored.

Figure 2B:
Figure 2B:

FIG. 2B illustrates an alternative backup dataset inventory 124D, storage media inventory 126B, and storage media 220 and 222 in accordance with certain implementations of the invention. In particular, backup dataset inventory 124D and storage media inventory 126B store version time stamp tokens associated with different versions of backup copies of the source volumes. For example, the backup dataset inventory 124D shows that a backup for Dataset X was generated on Monday at 3:05 p.m. from source volume 204S and another backup was generated on Tuesday at 3:11 p.m. from source volume 204S. The storage media inventory 126B shows that the version of source volume 204S taken on Monday 3:05 p.m. is stored on storage media 210, and the version of source volume 204S taken on Tuesday 3:11 p.m. is stored on storage media 220. The use of a day and time for the version time stamp is merely illustrative, and the version time stamp token may take on different forms (e.g., the version time stamp token may include a date, such as Aug. 8, 2002). Thus, the use of version time stamp tokens enables support for multiple versions of backup copies.

The backup dataset inventory 124D and storage media inventory 126B may be used in the event that datasets are moved from one source volume to another between backup copies. For example, if Dataset X were moved from source volume 204S to source volume 206S on Monday after the Monday backup at 3:05 p.m., the Tuesday 3:11 p.m. entry would reflect the new location of Dataset X on source volume 206S.

Also, all the source volumes in a copy pool will have an identical "atomic" version time stamp token that identifies the "instance" that all source volumes were suspended. In other words, if source volume 204S is copied to backup (i.e., dumped), then two minutes later source volume 206S is dumped, within the same suspend window (i.e., the period of time during which the source volumes in the copy pool are being dumped), the version time stamp token will represent the suspend window and not the actual times of individual source volumes being dumped.

Figure 3A:
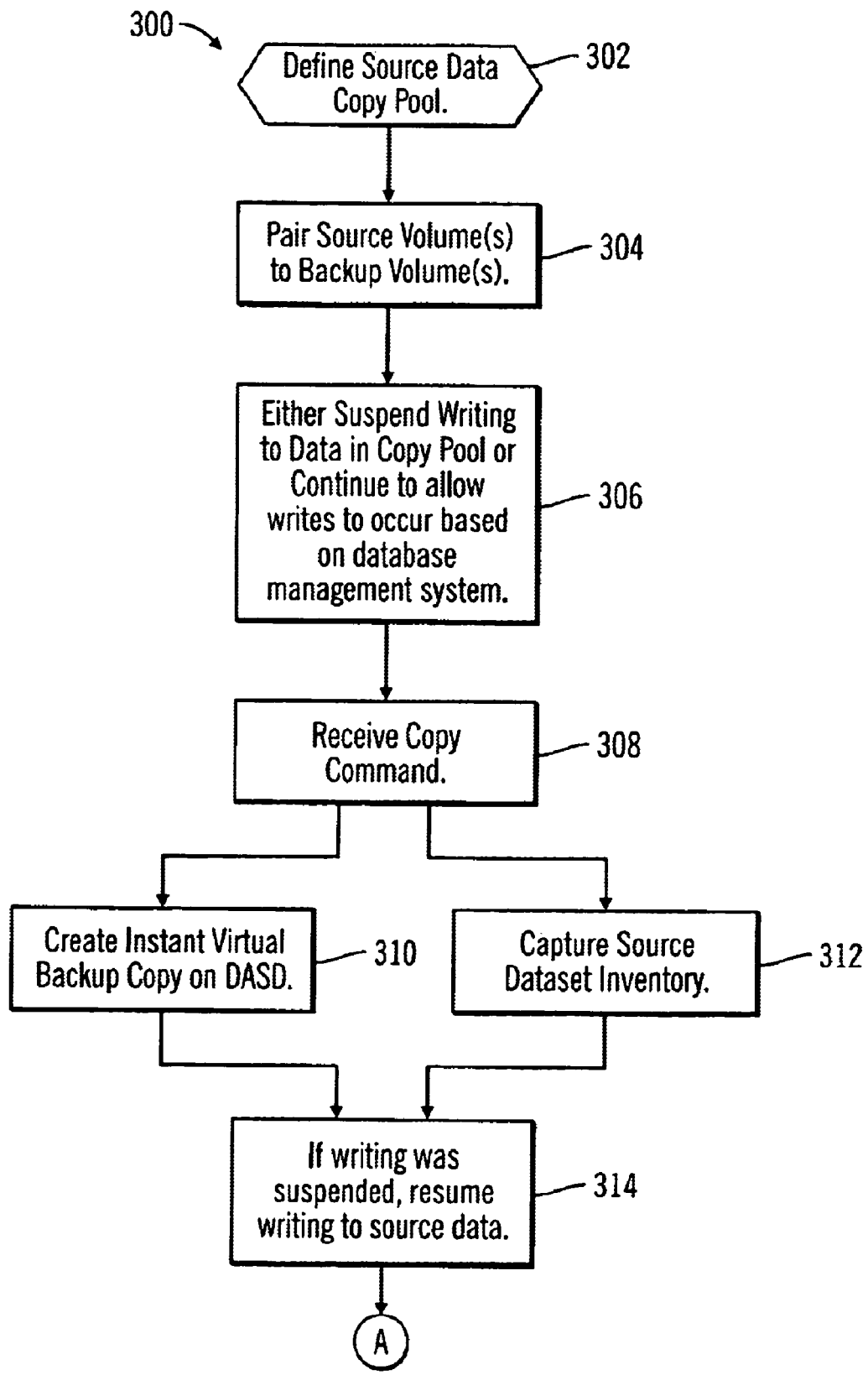
FIGS. 3A and 3B illustrate logic implemented in the backup manager in accordance with certain implementations of the invention.
Figure 3B:
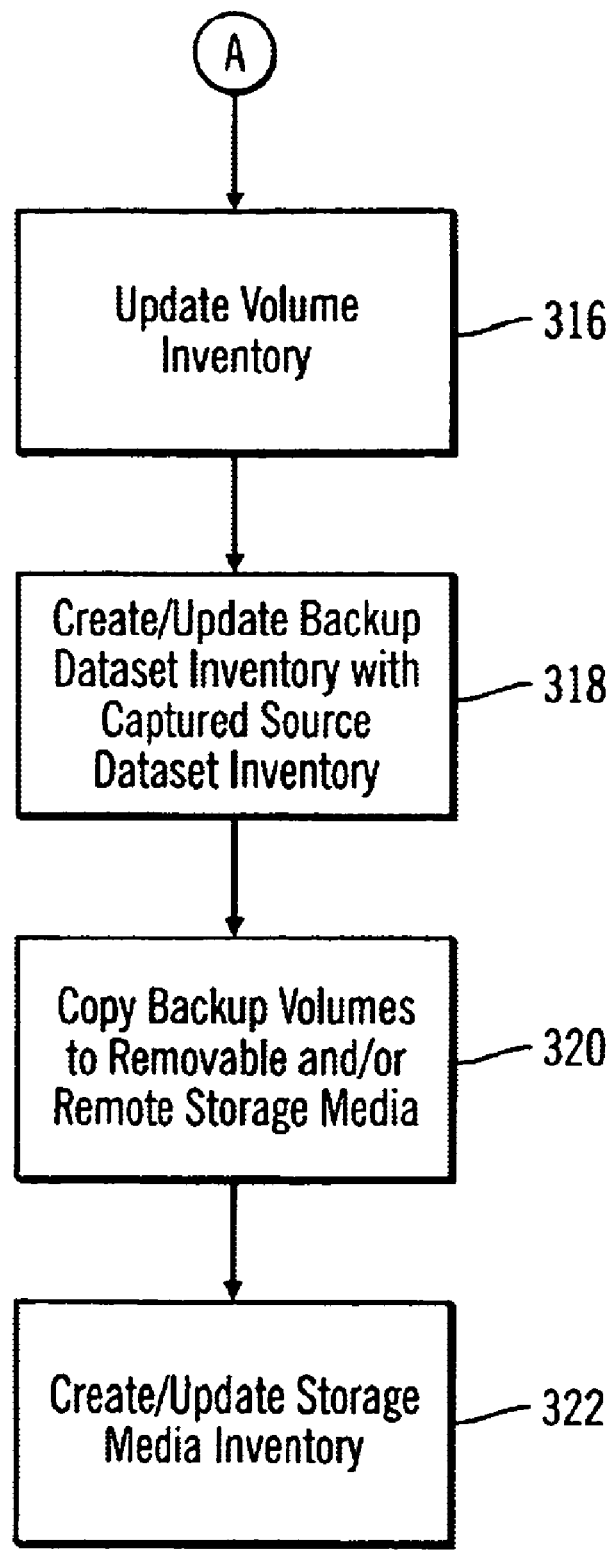

FIGS. 3A and 3B illustrate logic implemented in the backup manager 120 in accordance with certain implementations of the invention. Control sequence 300 begins at block 302 with the backup manager 120 defining a source data copy pool in response to receiving a definition of at least one "copy pool" of source data. The copy pool definitions may be received from various sources, including a human operator (via the operator interface 112), or from the host 102 or another source via the host 102 or operator interface 112. Each copy pool is shorthand for a desired body of data in the DASDs 140, 142, and specifies, for example, one or more volumes, although any other unit of data may be used. Because the backup manager 120 automatically recognizes the copy pools as shorthand for the underlying data, this will expedite future user entry of storage commands. For instance, the backup manager 120 may recognize when data management commands from the operator interface 112 and host 102 utilize copy pools, and in such cases, utilize a copy pool directory 124B to identify the underlying volumes upon which to perform the data management command. Since the sequence 300 may be performed without using copy pools, however, the process is optional. Furthermore, although shown here in one continuous sequence, block 302 may be performed independently of any instant virtual copy operation. Accordingly, block 302 may be performed at any time the making of a backup copy is contemplated.

In block 304, the backup manager 120 pairs the source volumes (to be copied) of block 302 with an equal number of available backup volumes, in anticipation of a possible future copy operation. With reference to FIG. 2A, block 304 pairs source volumes 204S, 206S with backup volumes 204B, 206B, respectively. As this pairing anticipates future copy operations, it serves to speed their ultimate completion. In certain implementations, since various operations may be suspended while the copy operations complete (as discussed below), the pre-pairing of block 304 helps minimize any down-time of applications at the host 102 during copying. Alternatively, block 304 may be performed at another time, such as "on demand," or automatically after block 306, etc.

In certain implementations, in block 306, the host 102 "suspends" writing to the source copy pool 202SCP in anticipation of that host 102 issuing a copy or backup command based on the particular database management system. In this disclosure, this operation is referred to as "write-suspend." Write-suspend may be performed by various host entities, such as each individual host application program seeking backup, a central backup coordination facility in the host, or another processing entity, machine, processing thread, etc. For ease of reference, write-suspend is discussed as being performed by the "host." The host may implement write-suspend by performing any suitable technique that does not risk the possibility of creating an invalid backup copy. For example, write-suspend techniques are not permissible if they permit writing to the source data in a way that destroys the correspondence between source and backup volumes. In other words, backup data is only valid if, after a recovery process using the backup data is fully applied, the backup data matches the source data for a given point in time.

In certain implementations, in block 306, the host 102 may continue to write to the source copy pool 202SCP based on the particular database management system. In certain implementations, the host 102 may suspend some operations, such as extends and splits, that could result in invalid backups.

Block 306 may be initiated by the host 102 (and any devices under its control). Some techniques to implement block 306 include:

1. The host 102 managing host applications so that they do not conduct any writes to data of the source copy pool 202SCP.
2. The host 102 buffering all data submitted by host applications for writing to the source copy pool 202SCP, and deferring actual writing of any buffered data until after lifting write-suspend.
3. The host 102 instructing one or more data storage devices containing the source copy pool 202SCP to refrain from writing during write-suspend.
4. The host 102 permitting host applications to continue to write to the source data, with the host or its application logging such writes to a log file.
5. The host 102 permitting atomic writes, and non-atomic writes on a limited basis. "Atomic" writes are those that are done "in-place" that can be done in a single I/O request with only one track or contiguous extent of tracks involved. The storage subsystem ensures that an atomic write is done without interruption. Atomic writes are permitted, although they are still logged, such as by using undo, re-do, or other logs that allow backup data to be recovered to a consistent state at a given time. As for non-atomic writes, they are processed by a technique such as one of the following: (a) requiring the host application to wait until suspension is lifted, or (b) buffering non-atomic write data and deferring actual writing of the buffered data until suspension is lifted.
6. The host 102 failing the writes, and notifying the host application that the write did not succeed. This allows the host application to perform (a) wait until suspension is lifted and try again, or (b) reverse the transaction that this write was involved with.

Optionally, if write-suspend is used, the backup manager 120 in block 306 may communicate with the hosts 102 to confirm that write-suspend is in place.

In block 308, the backup manager 120 receives a copy command from the host 102 or operator interface 112. The copy command comprises instructions to copy a body of source data. The copy command may comprise a copy command alone, or a copy operation as part of another larger operation such as data migration, data move, etc. The copy command specifies a body of source data, which in this example comprises one or more source volumes identified by the source copy pool of block 302. Responsive to receiving the host copy command, if write-suspend is used, the backup manager 120 may confirm (if not already confirmed in block 304) that write-suspend is underway.

Responsive to the copy command of block 308, the backup manager 120 utilizes the copy pool directory 1248 to identify the underlying source volumes that make up the copy pool specified in the copy command of block 308, and then performs blocks 310 and 312 concurrently. In block 310, the storage manager 132 performs an instant virtual backup copy operation (such as FLASH COPY) based upon the source copy pool. In block 312, the backup manager 120 captures the source dataset inventory 122. Block 312 may be performed by any suitably fast technique, to minimize the time that write data may be suspended. For instance, the source data inventory 122 may be copied by instant virtual copy, by reading the inventory into temporary memory, by performing a disk copy, or by another appropriate replication technique. Block 312 may be performed while write operations are suspended in order to take advantage of the natural inactivity of the source dataset inventory during operations 310 and 312', and thereby avoid interrupting, suspending, or otherwise disturbing the source dataset inventory.

Next, if write-suspend were implemented, writing to source data is resumed (block 314). This may be accomplished, for example, by the backup manager 120 notifying the host 102 that the write suspension may be lifted, and in turn, the host 102 resuming writing data to the source copy pool 202SCP.

Then, the backup manager 120 updates the volume inventory 124A by cross-referencing source volume 204S against counterpart backup volume 204B, and source volume 206S against backup volume 2061 (block 316). Next, in block 318, the backup manager 120 creates a backup dataset inventory, or updates an existing backup dataset inventory for the source volumes involved in block 308. The backup dataset inventory is shown by 124C in FIG. 2A. Block 318 is performed by incorporating the captured source data inventory 122 (from block 312) into the backup dataset inventory 124C being updated/created in block 318.

In block 320, backup volumes are copied to removable and/or remote storage media. The removable and/or remote storage media may include, for example, magnetic tapes, CD-ROMS, or remote disk. The removable storage media may be moved off site for use in disaster recovery. In block 322, a storage media inventory 126A, 126B is created and/or updated.

In certain implementations, with reference to FIG. 2B and the alternative backup dataset inventory 124D and storage media inventory 126B, in block 318, backup versions created in backup dataset inventory 124D are indicated by a unique version time stamp token to distinguish the different versions maintained in the inventory. Additionally, in block 322, the storage media inventory 126B contains the same version time stamp token, so that for each version in backup dataset inventory 124D, there is a corresponding time stamp to identify the correct storage media for recovery.

The backup dataset inventory 124D describes each dataset that has been backed up and identifies the backup versions available, indicated by version time stamp token. Although the backup copies have not yet been made to the remote/removable storage media in block 318, processing in block 318 may be performed with knowledge of the version time stamp token. In this case, instead of looking up Dataset X residing on source volume 204S in backup dataset inventory 124C, the backup manager 120 finds that Dataset X has multiple backup versions available in table 124D, and uses this information to identify the corresponding storage media in storage media inventory 126B based on matching the version time stamp token.

Figure 4A:
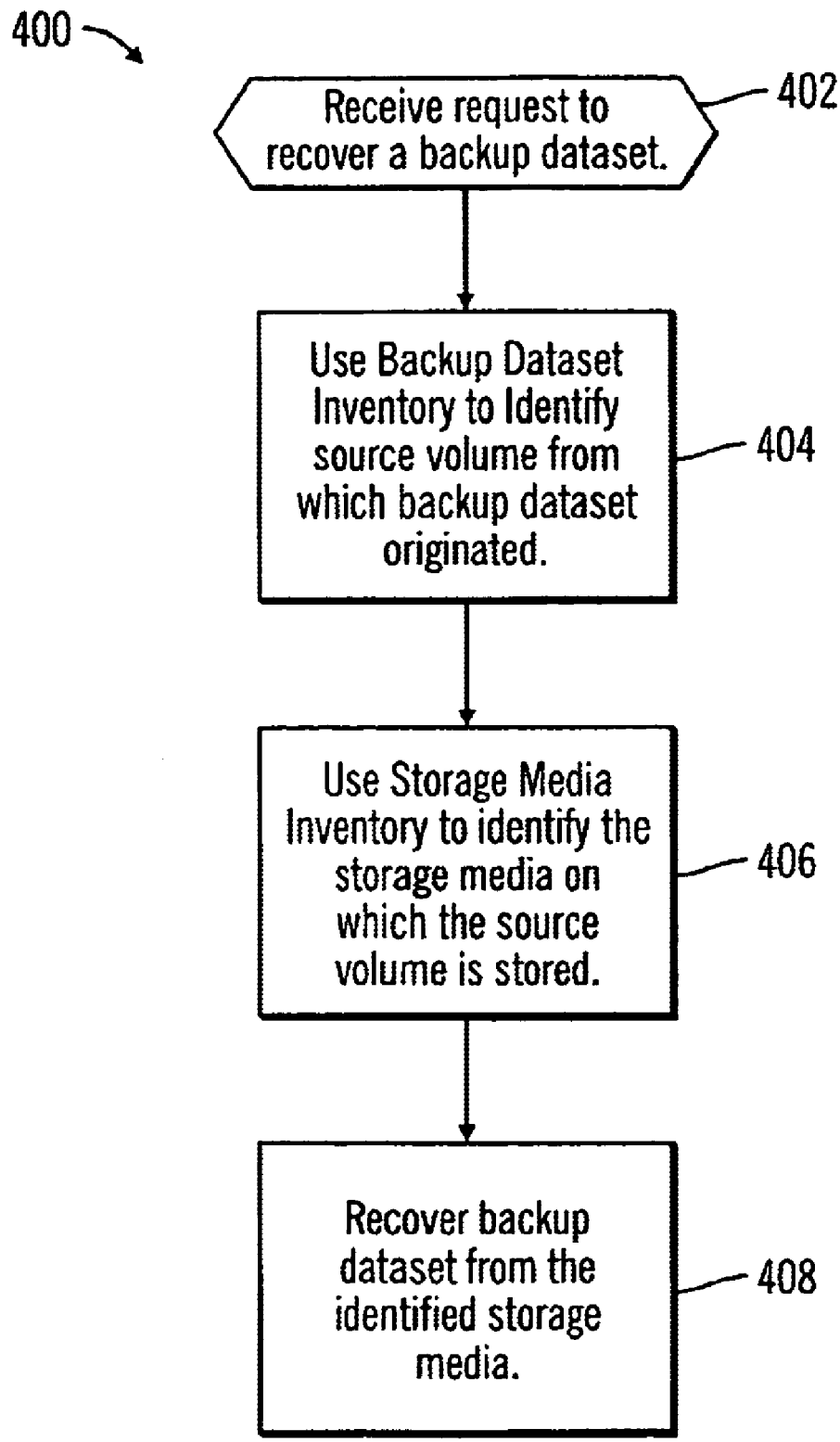
FIGS. 4A, 4B, and 4C illustrate logic implemented in the backup manager in accordance with certain implementations of the invention.

FIG. 4A illustrates logic implemented in the backup manager 120 to recover an individual backup dataset from physical storage media 156 for a logical application failure in accordance with certain implementations of the invention. Control sequence 400 begins at block 402 with the backup manager 120 receiving a request to recover a backup dataset from, for example, a host 102. The request for a backup dataset is used merely to illustrate certain implementations of the invention, and other units of data may be requested in other implementations. In block 404, the backup manager 120 uses the backup dataset inventory 124C to identify a source volume from which the requested backup dataset originated. For example, if the request specified Dataset X, the backup dataset inventory 124C would be used to identify source volume 204S. In block 406, the backup manager 120 uses the storage media inventory 126A, 126B to identify the storage media on which the source volume 204S is stored. For example, source volume 204S is stored on storage media 210. In block 408, the backup manager 120 recovers the requested backup dataset from storage media and returns the backup dataset to, for example, the host 102. For example, Dataset X is recovered from storage media 210 and returned to the host 102.

Figure 4B:
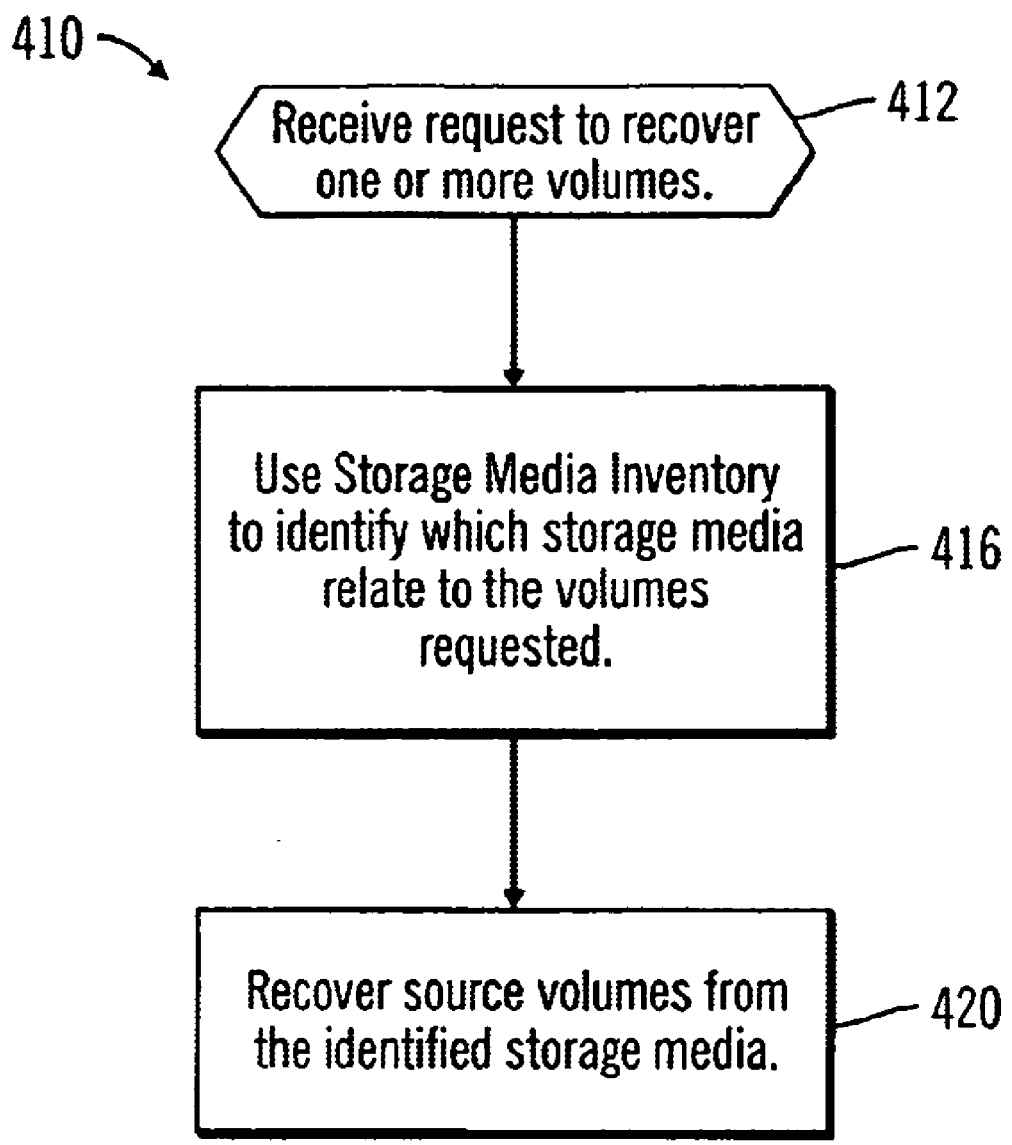

FIG. 4B illustrates logic implemented in the backup manager 120 to recover a set of datasets associated with one or more failed physical volumes (e.g., volumes stored on DASD 140 or 142) from physical storage media 156 in accordance with certain implementations of the invention. Control sequence 410 begins at block 412 with the backup manager 120 receiving a request to recover one or more volumes. In block 416, the backup manager 120 uses the storage media inventory 126A, 126B to identify which storage media relate to the volumes requested in block 412. In block 420, the backup manager 120 recovers source volumes from the identified storage media.

Figure 4C:
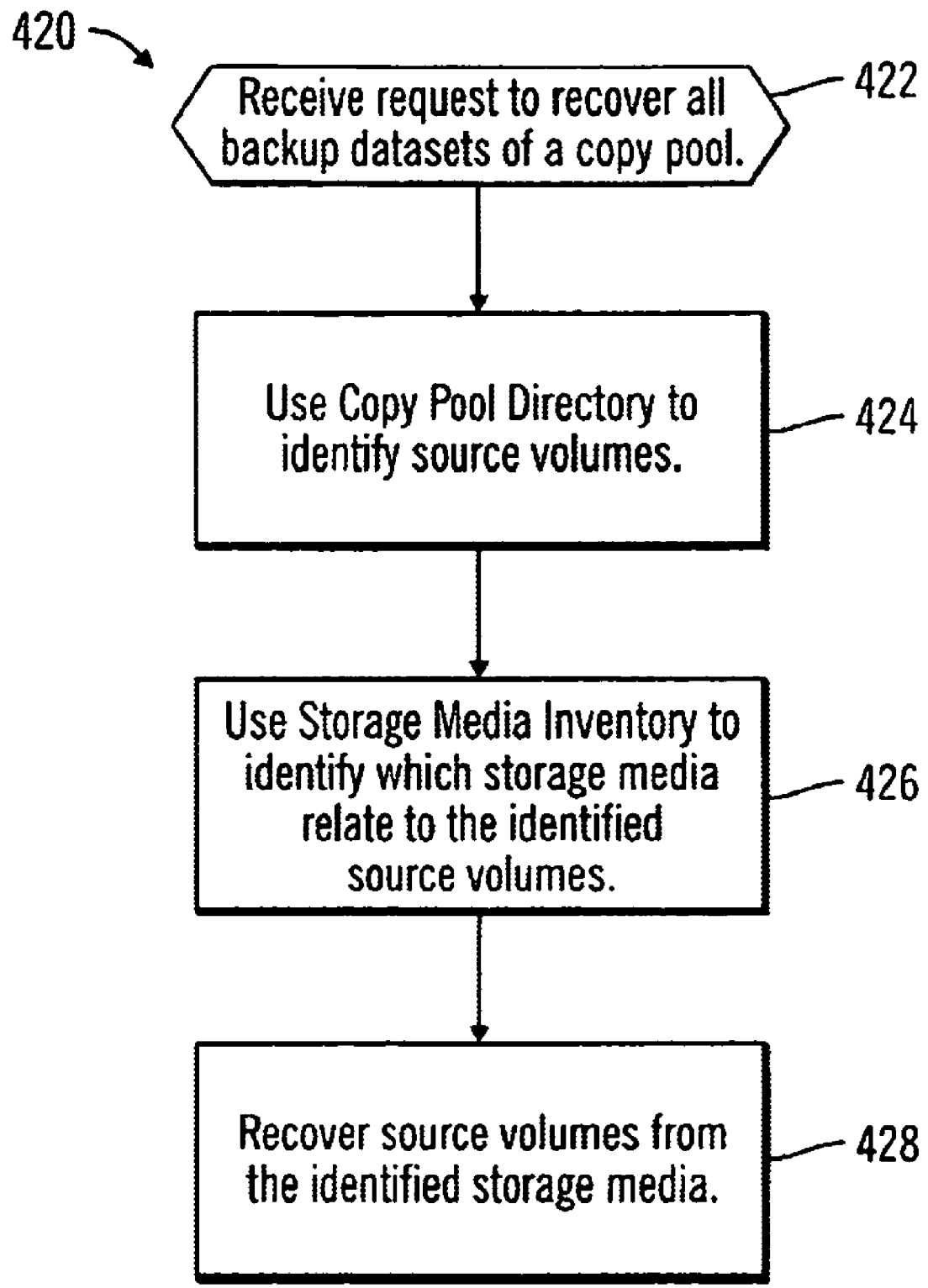

FIG. 4C illustrates logic implemented in the backup manager 120 to recover all backup datasets (e.g., all volumes stored on DASD 140 or 142) associated with a copy pool in accordance with certain implementations of the invention. Control sequence 420 begins at block 422 with the backup manager 120 receiving a request to recover all backup datasets of a copy pool. In block 424, the backup manager 120 uses the copy pool directory 124B to identify source volumes. In block 426, the backup manager 120 uses the storage media inventory 126A, 126B to identify which storage media relate to the volumes identified in block 424. In block 428, the backup manager 120 recovers source volumes from the identified storage media.

In certain implementations, the backup manager 120 is implemented as part of a database system and is told to suspend updates to datasets (e.g., via a SUSPEND command for a DB2® system from IBM). At this time, applications running on hosts 102 may store updates to datasets and send them when the database system accepts the updates. Alternatively, the backup manager 120 at the database system may store updates from applications, without applying the updates to datasets until the database system may resume updating the datasets.

While applications are suspended, instant virtual copies (e.g., FLASH copies) are made and dataset information is extracted from a catalog (i.e., metadata describing data in the datasets is extracted). In certain implementations, the instant virtual copies are made in two to five minutes. Thus, the applications stop processing or are in read-only rode for only two to five minutes, rather than the several hours required by conventional systems.

When all instant virtual copies complete, the backup manager 120 of the database system is told to accept updates (e.g., via a RESUME command for a DB2® system). The applications can then continue to send updates to the database system. Meanwhile, the dataset information is used to create or update a backup dataset inventory. Additionally, full volume transfers are taken of the backup volumes from DASD 140 and 142 to storage media (e.g., magnetic tapes). The full volume transfers may occur such that the storage media on which the volumes are stored appear to have been written from source volumes, rather than from backup volumes, which is explained further in U.S. Pat. No. 6,557,089, issued on Apr. 29, 2003, entitled "Backup by ID-Suppressed Instant Virtual Copy then Physical Backup Copy with ID Reintroduced," by David Reed et al., having application Ser. No. 09/724,129, filed on Nov. 28, 2000, and which is incorporated by reference herein in its entirely. The storage media may be taken offsite for disaster recovery protection.

In certain implementations, there may be multiple instant virtual backup copies, and one of more of the backup copies is transferred to removable and/or remote storage media. For example, instant virtual backup copies may be generated every four hours, while the backup copies are copied to removable and/or remote storage media every twelve hours.

The invention provides a technique to efficiently recover data from storage media. One or more datasets that have been modified by one or more applications may be recovered. The invention eliminates the need to generate both image copies and perform volume dumps.

Enterprise Storage Server, DB2, OS/390, z/OS, and S/390 are trademarks of Application and Products (SAP).

ADDITIONAL IMPLEMENTATION DETAILS

The above described implementations may be implemented using standard programming and/or engineering techniques to produce software, firmware, hardware, or any combination thereof.

In certain implementations, the backup dataset inventory 124C may include a column for the backup datasets (e.g., Datasets X, Y, and Z) and a column for the storage media (e.g., 210 and 212). In this case, for the backup procedure, backup volumes are copied to removable and/or remote storage media (block 320), and then, the backup manager 120 creates a backup dataset inventory, or updates an existing backup dataset inventory for the source volumes involved (block 318). That is, in FIG. 3B, the processing within block 320 occurs before the processing within block 318. For the recovery procedure, the backup manager 120 uses the backup dataset inventory 124C to identify the storage media on which the backup dataset to be recovered resides and recovers the backup dataset.

The logic of FIGS. 3A–3B and 4A–4C describes specific operations occurring in a particular order. In alternative implementations, certain of the logic operations may be performed in a different order, modified or removed. Morever, blocks may be added to the above described logic and still conform to the described implementations. Further, operations described herein may occur sequentially or certain operations may be processed in parallel, or operations described as performed by a single process may be performed by distributed processes.

The logic of FIGS. 3A–3B and 4A–4C was described as being implemented in software. This logic may be part of the operating system of the host systems or an application program. In yet further implementations, this logic may be maintained in storage areas or in a read only memory or other hardwired type of device. The preferred logic may be implemented in hard disk drives or in programmable and non-programmable gate array logic.

Figure 5:
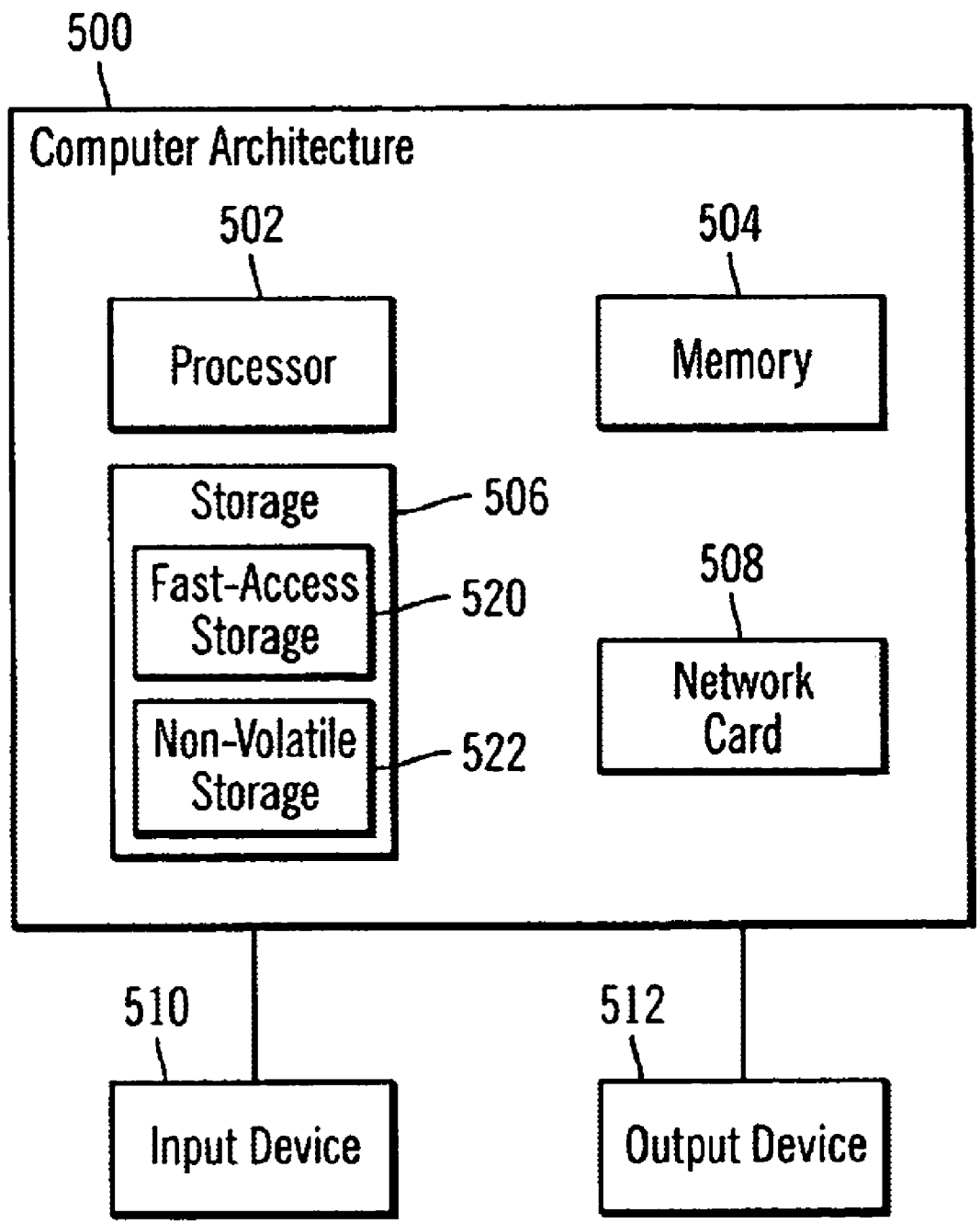
FIG. 5 illustrates, in a block diagram, one implementation of the architecture of hosts, backup manager, and/or storage manager in accordance with certain implementations of the invention.

FIG. 5 illustrates, in a block diagram, one implementation of the architecture of hosts 102, backup manager 120, and/or storage manager 132 in accordance with certain implementations of the invention. The computer architecture 500 includes a processor 502 (e.g., a microprocessor), a memory 504 (e.g., a volatile memory device), and storage 506. The storage 506 may include fast access storage 520 and non-volatile storage 522. The fast-access storage 522 may comprise random access memory (RAM), and may be used to store the programming instructions executed by the processor 502. The nonvolatile storage 522 may comprise, for example, battery backup RAM, EEPROM, one or more magnetic data storage disks such as a "hard drive," an optical disk drive, a tape drive, or any other suitable storage device. The storage 506 may comprise an internal storage device or an attached or network accessible storage. Programs in the storage 506 are loaded into the memory 504 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, magnetic tape, etc. Input and output devices 510 and 512 may be connected to the computer architecture 500 via a line, bus, cable, electromagnetic link, or other means for the processor 502 to exchange data with other hardware external to the computer architecture 500.

Despite the specific foregoing description, ordinarily skilled artisans (having the benefit of this disclosure) will recognize that the computer architecture 500 may be implemented in a machine of different construction, without departing from the scope of the invention. As a specific example, one of the components 520 and/or 522 may be eliminated; furthermore, the storage 506, 520 and/or 522 may be provided on-board the processor 502, or even provided externally to the computer architecture 500.

Certain implementations of the invention use logic circuitry instead of computer-executed instructions to implement processing entities such as the backup manager 120 and the storage manager 132. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Figure 6:
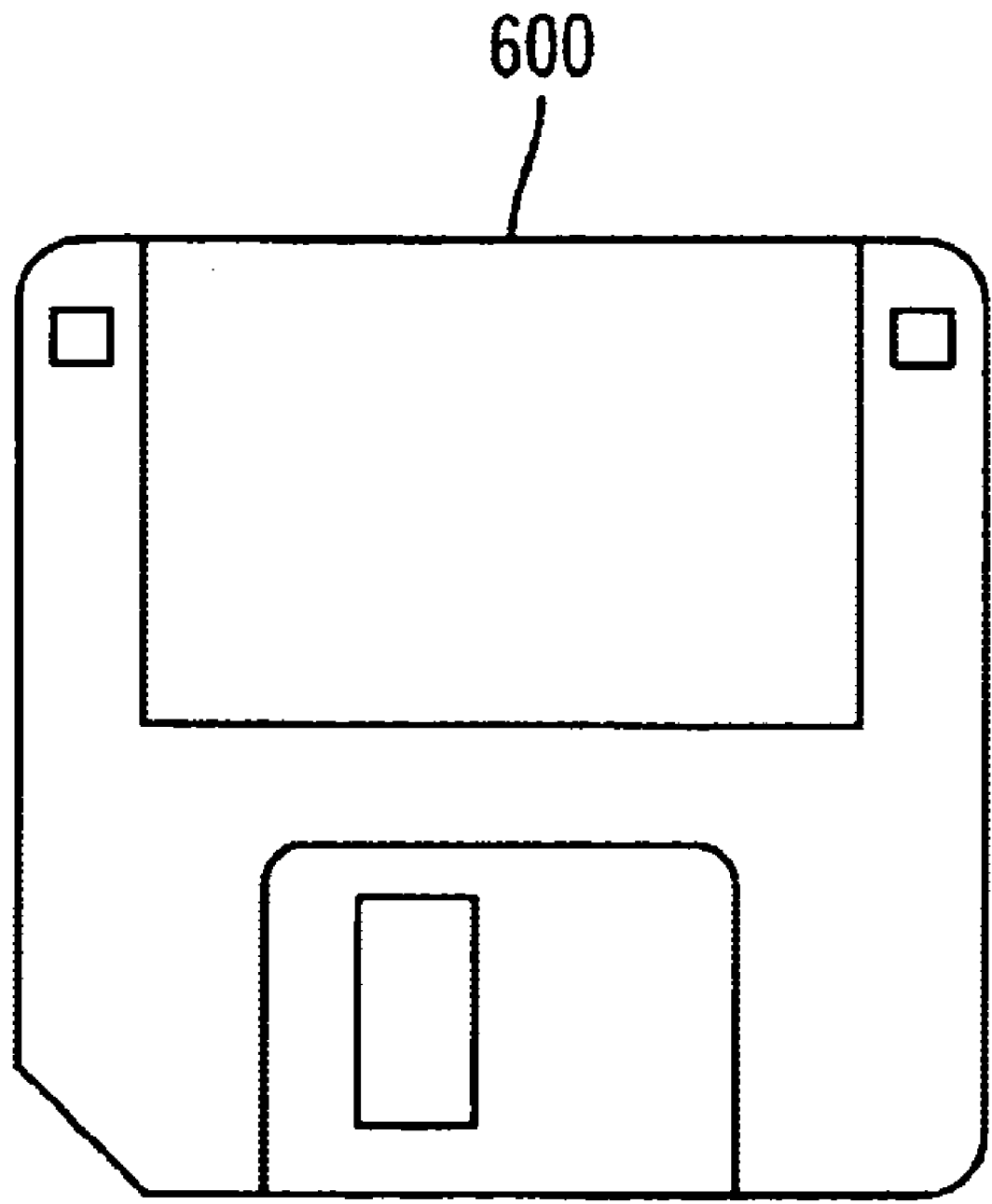
FIG. 6 illustrates a magnetic data storage diskette in accordance with certain implementations of the invention.

Wherever the functionality of the invention is implemented using a machine-executed program sequence, such a sequence may be embodied in various forms of signal-bearing media. In the context of FIG. 5, this signal-bearing media may comprise, for example, the storage 506 or another signal-bearing media, such as a magnetic data storage diskette 600 (FIG. 6), directly or indirectly accessible by a processor 502. Whether contained in the storage 506, diskette 600, or elsewhere, the instructions may be stored on a variety of machine-readable data storage media. Some examples include direct access storage (e.g., a conventional "hard drive," redundant array of inexpensive disks (RAID), or another DASD), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In certain implementations of the invention, the machine-readable instructions may comprise software object code, compiled from a language such as assembly language, C, etc.

The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for data backup, comprising:
    creating a backup copy of source data;
    creating a backup dataset inventory when creating the backup copy, wherein the backup dataset inventory comprises a backup dataset identifier and an originating source volume identifier for each dataset of the source data;
    copying the backup copy to a storage medium; and
    creating a storage media inventory when copying the backup copy to the storage medium, wherein the storage media inventory comprises the originating source volume identifier and a storage media identifier for each dataset of the source data.

2. The method of claim 1, wherein copying the backup copy to the storage medium eliminates having to issue both image copies for individual dataset recovery and separate full volume dumps for recover of failed physical volumes or to recover an entire application.

3. The method of claim 1, wherein the storage medium is removable.

4. The method of claim 1, wherein the storage medium is remote.

5. The method of claim 1, wherein the source data includes a dataset and further comprising:
    recovering the dataset from the storage medium using the backup dataset inventory to identify an originating source volume from which the dataset originated and using the storage media inventory to identify the storage medium on which the originating source volume resides.

6. The method of claim 5, further comprising recovering the dataset by copying the dataset from the storage medium to a source volume.

7. The method of claim 1, wherein the backup dataset inventory is generated from a source dataset inventory including a source volume identifier and an associated dataset identifier.

8. The method of claim 1, wherein copying source data to create the backup copy further comprises:

performing backup operations comprising:
(i) performing an instant virtual copy of a body of source data to create the backup copy; and
(ii) capturing contents of a source dataset inventory relating datasets in the source data and locations in the body of source data where the datasets are stored; and
adding the captured contents to the backup dataset inventory relating datasets in the backup copy and locations in the source copy from which the backup copy datasets originated.

9. The method of claim 1, wherein the source data comprises datasets and further comprising:
recovering all datasets associated with a failed physical volume.

10. The method of claim 1, wherein the source data comprises datasets and further comprising:
recovering all datasets associated with an application.

11. The method of claim 1, wherein the source volume comprises multiple datasets and wherein creation of the backup copy eliminates a need to generate backup image copies of each of the multiple datasets.

12. The method of claim 1, wherein each dataset that is backed up has a unique version time stamp token.

13. The method of claim 12, wherein the backup dataset inventory stores the unique version time stamp token for each dataset, wherein the storage media inventory stores a corresponding version time stamp token, and further comprising:
receiving a request to recover a version of a dataset; and
identifying the storage medium on which the version of the dataset is stored by matching the unique version time stamp token in the backup dataset inventory to the corresponding version time stamp token in the storage media inventory.

14. A memory for storing data for access by an application program, comprising:
a data structure stored in the memory, wherein the data structure includes data for use by the application program and comprising:
a source dataset inventory including a source volume identifier and an associated dataset identifier;
a backup dataset inventory including an originating source volume identifier and an associated backup dataset identifier; and
a storage media inventory including an originating source volume identifier and a storage media identifier.

15. A system for data backup, comprising:
a processor;
memory coupled to the processor;
at least one program executed by the processor in the memory to cause the processor to perform:
(i) creating a backup copy of source data;
(ii) creating a backup dataset inventory when creating the backup copy, wherein the backup dataset inventory comprises a backup dataset identifier and an originating source volume identifier for each dataset of the source data;
(iii) copying the backup copy to a storage medium; and
(iv) creating a storage media inventory when copying the backup copy to the storage medium, wherein the storage media inventory comprises the originating source volume identifier and a storage media identifier for each dataset of the source data.

16. The system of claim 15, wherein copying the backup copy to the storage medium eliminates having to issue both image copies for individual dataset recovery and separate full volume dumps for recover of failed physical volumes or to recover an entire application.

17. The system of claim 15, wherein the storage medium is removable.

18. The system of claim 15, wherein the storage medium is remote.

19. The system of claim 15, wherein the source data includes a dataset and wherein the at least one program further causes the processor to perform:
recovering the dataset from the storage medium using the backup dataset inventory to identify an originating source volume from which the dataset originated and using the storage media inventory to identify the storage medium on which the originating source volume resides.

20. The system of claim 19, wherein the at least one program further causes the processor to perform:
recovering the dataset by copying the dataset from the storage medium to a source volume.

21. The system of claim 15, wherein the backup dataset inventory is generated from a source dataset inventory including a source volume identifier and an associated dataset identifier.

22. The system of claim 15, wherein for copying source data to create the backup copy, the at least one program further causes the processor to perform:
backup operations comprising:
(i) performing an instant virtual copy of a body of source data to create the backup copy; and
(ii) capturing contents of a source dataset inventory relating datasets in the source data and locations in the body of source data where the datasets are stored; and
adding the captured contents to the backup dataset inventory relating datasets in the backup copy and locations in the source copy from which the backup copy datasets originated.

23. The system of claim 15, wherein the source data comprises datasets and wherein the at least one program further causes the processor to perform:
recovering all datasets associated with a failed physical volume.

24. The system of claim 15, wherein the source data comprises datasets and wherein the at least one program further causes the processor to perform:
recovering all datasets associated with an application.

25. The system of claim 15, wherein the source volume comprises multiple datasets and wherein creation of the backup copy eliminates a need to generate backup image copies of each of the multiple datasets.

26. The system of claim 15, wherein each dataset that is backed up has a unique version time stamp token.

27. The system of claim 26, wherein the backup dataset inventory stores the unique version time stamp token for each dataset, wherein the storage media inventory stores a corresponding version time stamp token, and wherein the at least one program further causes the processor to perform:
receiving a request to recover a version of a dataset; and
identify the storage medium on which the version of the dataset is stored by matching the unique version time stamp token in the backup dataset inventory to the corresponding version time stamp token in the storage media inventory.

28. An article of manufacture embodied as a computer readable medium including a program for data backup, wherein the program causes operations to be performed, the operations comprising:

creating a backup copy of source data;

creating a backup dataset inventory when creating the backup copy, wherein the backup dataset inventory comprises a backup dataset identifier and an originating source volume identifier for each dataset of the source data;

copying the backup copy to a storage medium; and creating a storage media inventory when copying the backup copy to the storage medium, wherein the storage media inventory comprises the originating source volume identifier and a storage media identifier for each dataset of the source data.

29. The article of manufacture of claim 28, wherein copying the backup copy to the storage medium eliminates having to issue both image copies for individual dataset recovery and separate full volume dumps for recover of failed physical volumes or to recover an entire application.

30. The article of manufacture of claim 28, wherein the storage medium is removable.

31. The article of manufacture of claim 28, wherein the storage medium is remote.

32. The article of manufacture of claim 28, wherein the source data includes a dataset and the operations further comprising:

recovering the dataset from the storage medium using the backup dataset inventory to identify an originating source volume from which the dataset originated and using the storage media inventory to identify the storage medium on which the originating source volume resides.

33. The article of manufacture of claim 32, the operations further comprising:

recovering the dataset by copying the dataset from the storage medium to a source volume.

34. The article of manufacture of claim 28, wherein the backup dataset inventory is generated from a source dataset inventory including a source volume identifier and an associated dataset identifier.

35. The article of manufacture of claim 28, wherein for copying source data to create the backup copy, the operations further comprise:

performing backup operations comprising:

(i) performing an instant virtual copy of a body of source data to create the backup copy; and (ii) capturing contents of a source dataset inventory relating datasets in the source data and locations in the body of source data where the datasets are stored; and adding the captured contents to the backup dataset inventory relating datasets in the backup copy and locations in the source copy from which the backup copy datasets originated.

36. The article of manufacture of claim 28, wherein the source data comprises datasets and the operations further comprising:

recovering all datasets associated with a failed physical volume.

37. The article of manufacture of claim 28, wherein the source data comprises datasets and the operations further comprising:

recovering all datasets associated with an application.

38. The article of manufacture of claim 28, wherein the source volume comprises multiple datasets and wherein creation of the backup copy eliminates a need to generate backup image copies of each of the multiple datasets.

39. The article of manufacture of claim 28, wherein each dataset that is backed up has a unique version time stamp token.

40. The article of manufacture of claim 39, wherein the backup dataset inventory stores the unique version time stamp token for each dataset, wherein the storage media inventory stores a corresponding version time stamp token, and the operations further comprising:

receiving a request to recover a version of a dataset; and identifying the storage medium on which the version of the dataset is stored by matching the unique version time stamp token in the backup dataset inventory to the corresponding version time stamp token in the storage media inventory.

* * * * *